United States Patent [19]

Fujita

[11] Patent Number: 5,150,348
[45] Date of Patent: Sep. 22, 1992

[54] TRACKING SERVO UTILIZING BEAM SPLITTER

[75] Inventor: Shuichi Fujita, Amagasaki, Japan

[73] Assignee: Mitsubishi Denki Kabushiki Kaisha, Japan

[21] Appl. No.: 619,758

[22] Filed: Nov. 28, 1990

[51] Int. Cl.$^5$ .............................................. G11B 7/00
[52] U.S. Cl. .................................................. 369/44.41
[58] Field of Search ..................... 369/43, 44.41, 44.14

[56] References Cited

U.S. PATENT DOCUMENTS

| | | | |
|---|---|---|---|
| 4,363,961 | 12/1982 | Okada et al. | 250/201 |
| 4,742,218 | 5/1988 | Nakamura et al. | 250/201 |
| 4,775,968 | 10/1988 | Ohsato | 369/44.41 X |
| 4,987,292 | 1/1991 | Howard | 250/201.5 |

FOREIGN PATENT DOCUMENTS 6168322  10/1986  Japan .

*Primary Examiner*—Robert L. Richardson
*Attorney, Agent, or Firm*—Wolf, Greenfield & Sacks

[57] ABSTRACT

An optical head is disclosed for detecting a tracking error on a recording medium by the reflected beam from the recording medium obtained by irradiating a beam on the recording medium. The optical head splits a light path of the reflected beam into two light paths wherein a first photo detector arranged before the focal point of the reflected beam in one light path having a light receiving area split into at least two parts detects the reflected beam in one light path, a second photo detector arranged beyond the focal point of the reflected light in the other light path having a light receiving area split into at least two parts detects the reflected beam in the other light path, and a control signal for tracking is generated by adding the output of the first photo detector to the output of the second photo detector. In this control signal for tracking occurs no offset even when an objective lens moves in the diametric direction of the recording medium and shifts the light path of the reflected beam.

5 Claims, 7 Drawing Sheets

TRACKING SERVO UTILIZING BEAM SPLITTER

BACKGROUND OF THE INVENTION

1. Field of the Invention

The present invention relates to an optical head for use in an optical recording/regenerating unit which optically records and regenerates data to/from a recording medium.

2. Description of Related Art

FIG. 1 shows construction and the light path of a conventional optical head disclosed in the Japanese Utility Model Application Laid-Open No. 61-68322 (1986). In FIG. 1, a beam (divergent beam) 1 emitted from a semiconductor laser (not shown) is deflected by a half mirror 2. In the traveling direction of the deflected beam is arranged a recording medium 4. Between this recording medium 4 and the half mirror 2 is arranged an objective lens 3 which focuses the deflected beam onto the recording medium 4. The beam reflected from the recording medium 4 is transmitted by the half mirror 2. In the traveling direction of the transmitted beam is arranged a photo detector with a light receiving area split into two parts 5a, 5b. This two-split photo detector is connected with an operational amplifier 6, which deducts an output of one part 5b of the photo detector from an output of the other part 5a of the photo detector.

With the above construction, the divergent beam 1 emitted from the semiconductor laser is deflected 90 degrees sideward by the half mirror 2 and projected onto the recording medium 4 by the objective lens 3. When this beam is focused on the recording medium 4, a small photo spot with a diameter of about 1 μm is formed on the recording medium 4. The beam reflected from the recording medium 4 is transmitted by the objective lens 3 and half mirror 2, then projected on the two-split photo detector 5a, 5b. According to the distribution of the quantity of divergent beam 1 entering the two-split photo detector 5a, 5b, the operational amplifier 6 detects a tracking error of the small photo spot on the recording medium 4. In response to this tracking error signal, the objective lens 3 is driven in the direction shown by an arrow T in FIG. 1, and tracking is carried out.

On the other hand, a focusing error detecting optical system (not shown) detects a focusing error of a small photo spot on the recording medium 4. In response to the focusing error signal, the objective lens 3 is driven to the direction shown by an arrow F in FIG. 1, and focusing is carried out.

Now will be described below a manner of detecting the tracking error. In FIG. 2(a), (b), (c) and (d), fragmentary sectional views of the recording medium 4 are shown on the left and views of the partial optical path made by the optical head. As shown in FIG. 2(a) and (c), where the small photo spot is located either in the center of a guide groove 4a on the recording medium 4 or in the center in between the grooves 4a, both quantity of the beams entering respective parts of the two-split photo detector 5a, 5b are equal.

However, as shown in FIG. 2(b), when the small photo spot deviates in the direction of crossing the guide groove 4a, the beam is diffracted by the guide groove 4a, and the quantity of the beam entering one part 5b of the photo detector (hatching portion in FIG. 2) is less than that of the beam entering the other part 5a of the photo detector. On the contrary, as shown in FIG. 2(d), where the small photo spot deviates in the opposite direction to the above case shown in FIG. 2(b), the quantity of the beam entering one part 5a of the photo detector (hatching portion) is less than that of the beam entering the other part 5b of the photo detector. As a result, whether the small photo spot is located properly in relation to the guide groove 4a or not and which direction the small photo spot deviates are detected by the difference between the outputs from two parts 5a and 5b of the photo detector. This method for detecting a tracking error is called a push-pull method.

As shown by the broken line in FIG. 3, in such conventional optical head as mentioned above, where the objective lens 3 moves in the direction of tracking (direction shown by an arrow T in FIG. 1) during tracking, the beam entering the two-split photo detector 5a, 5b is shifted, then, there is a problem that an offset is generated in the tracking error signal, which adversely affects the tracking.

SUMMARY OF THE INVENTION

The foregoing problem is dissolved in accordance with the present invention. The primary object of the present invention is to provide an optical head which splits a light path of the reflected light from a recording medium into two light paths and detects the reflected light in each light path by two photo detectors provided in the respective light paths so that no offset is generated in a tracking error signal even when an objective lens moves in the direction of tracking.

The above and further objects and features of the invention will more fully be apparent from the following detailed description with accompanying drawings.

DESCRIPTION OF THE PREFERRED EMBODIMENTS

Figure 4:
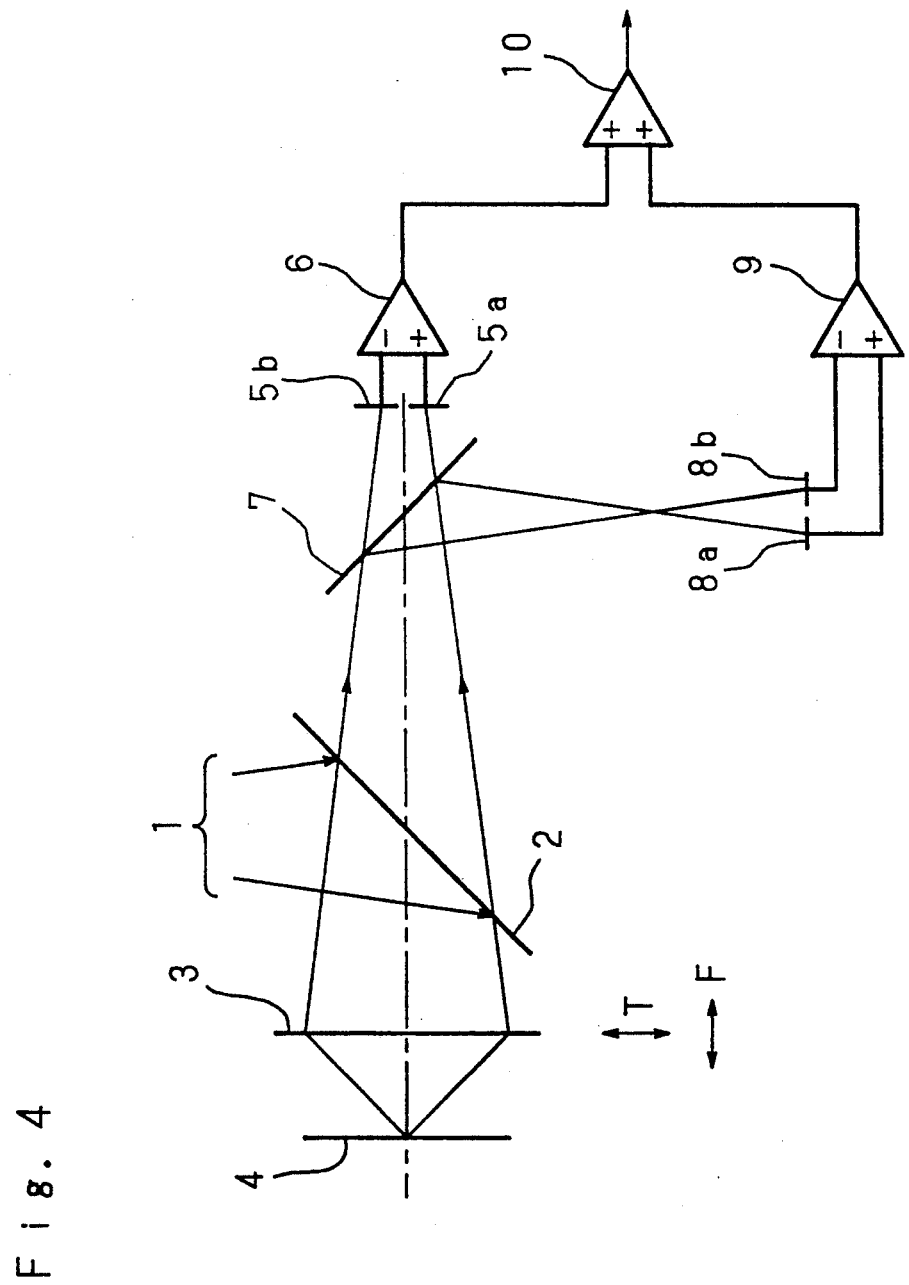
FIG. 4 is a block diagram to illustrate construction of one embodiment of an optical head of the present invention and its light path.
Figure 5:
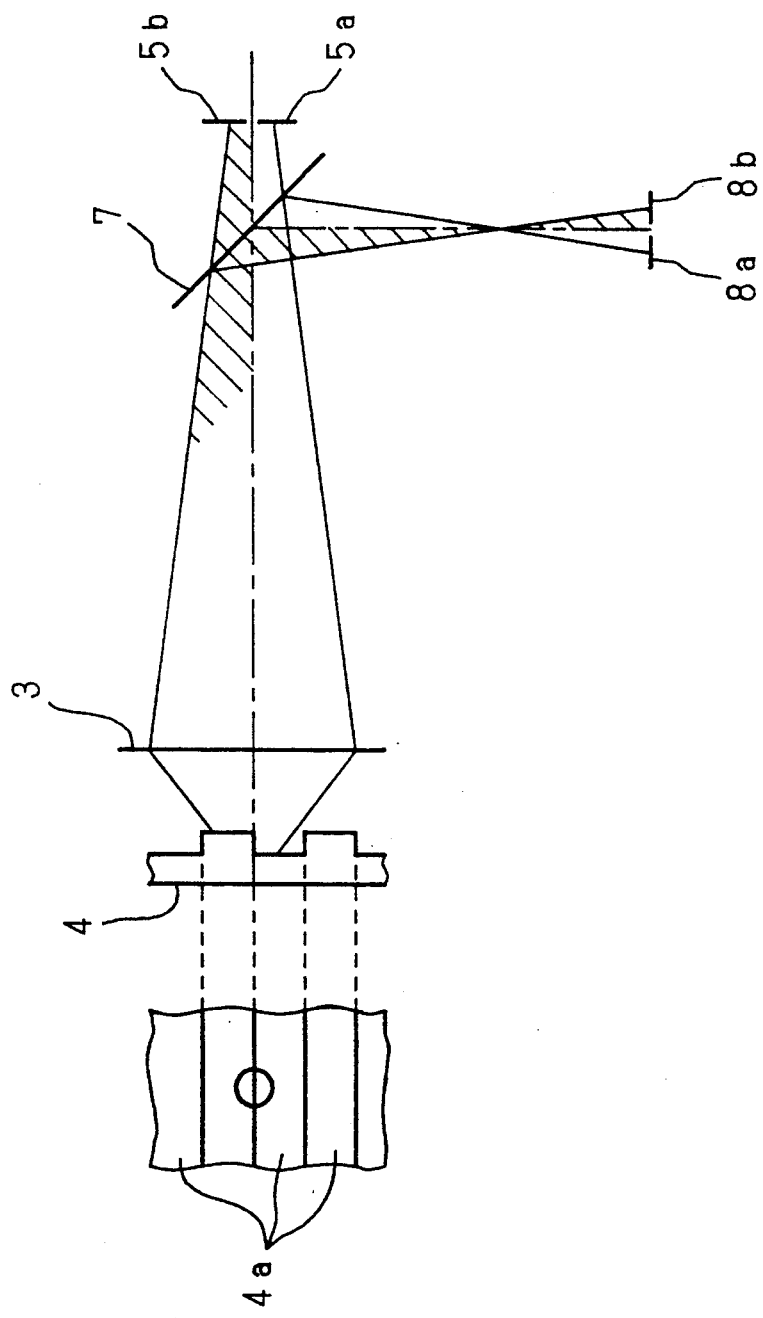
FIG. 5 is a schematic view to explain the method for detecting a tracking error of the optical head of the present invention.

Now will be described below one embodiment of the optical head of the present invention by referring to FIGS. 4 through 6. In FIG. 4, a beam (divergent beam) 1 emitted from a semiconductor laser (not shown) is deflected by a first half mirror 2. In the traveling direction of the deflected beam is arranged a recording medium 4. Between the recording medium 4 and the first half mirror 2 is arranged an objective lens 3 which focuses the deflected beam onto the recording medium 4. The beam reflected from the recording medium 4 is transmitted by the first half mirror 2. In the traveling direction of the reflected beam transmitted by the first half mirror 2 is arranged a second half mirror 7 which splits the reflected beam into two beams in their respective directions. In the traveling direction of the beams transmitted by the second half mirror 7 is arranged a first two-split photo detector 5a, 5b before the focal point of the transmitted beam. This first two-split photo detector 5a, 5b is connected with a first operational amplifier 6, which deducts an output of one part 5b of the first photo detector from an output of the other part 5a of the first photo detector.

In the traveling direction of the beam deflected 90 degrees sideward by the second half mirror 7 is arranged a second two-split photo detector 8a, 8b in a position beyond the focal point of said deflected beam. This second two-split photo detector 8a, 8b is connected with a second operational amplifier 9, which deducts an output of one part 8b of the second photo detector from an output of the other part 8a of the second photo detector. Both of the first and second operational amplifiers 6, 9 are connected with a third operational amplifier 10, which adds the output of the former to the output of the latter.

Figure 1:
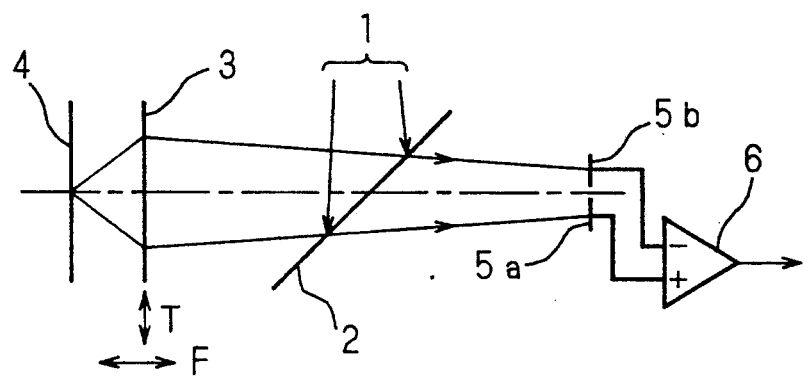
FIG. 1 is a block diagram to illustrate construction of a conventional optical head and its light path.
Figure 2A:
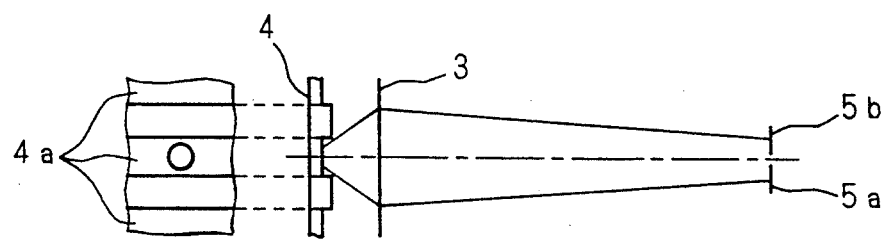
FIG. 2, consisting of (a)-(d), is a schematic view to explain the method for detecting a tracking error of the conventional optical head.
Figure 2B:
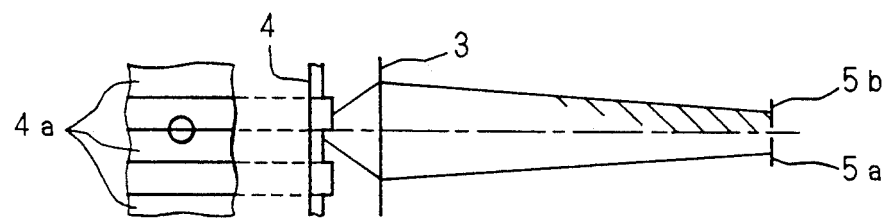
Figure 2C:
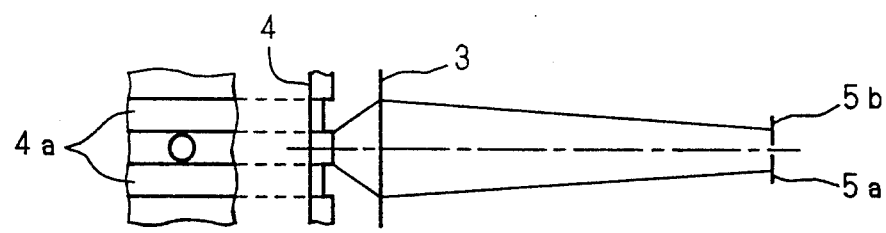
Figure 2D:
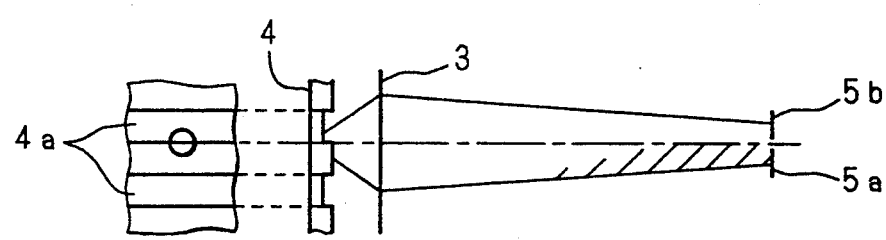
Figure 3:
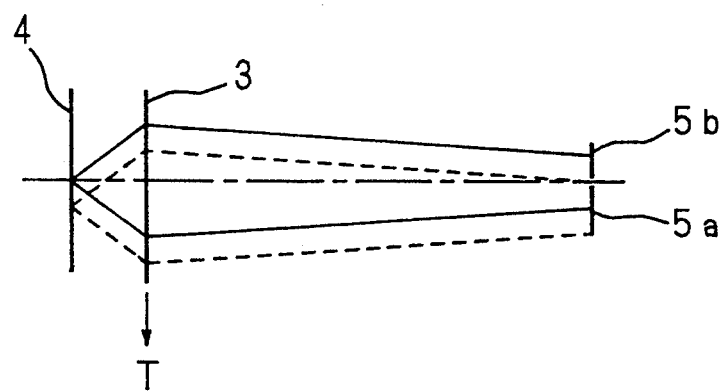
FIG. 3 is a schematic view to explain an offset in the tracking error of the conventional optical head.

Now will be described below operation of the optical head of the present invention. FIG. 5 shows a light path in the case where a photo spot on the recording medium 4 is located in a position deviated from the guide groove 4a in the same direction as shown in FIG. 2(b). In this case, the beam is diffracted by the guide groove 4a, and the quantity of the beam entering one part 5b of the first photo detector (hatching portion) is less than the quantity of the beam entering the other part 5a of the first photo detector. Accordingly, the output of the first operational amplifier 6 is positive.

On the contrary, the quantity of the beam entering one part 8b of the second photo detector (hatching portion) is less than the quantity of the beam entering the other part 8a of the second photo detector, accordingly, the output of the second operational amplifier 9 is positive. In other words, when the photo spot deviates from the guide groove 4a, the outputs of the first and second operational amplifiers 6, 9 are the same phase, then, a tracking error signal is obtained by adding the output of the first operational amplifier 6 to the output of the second operational amplifier 9 by the third operational amplifier 10.

Figure 6:
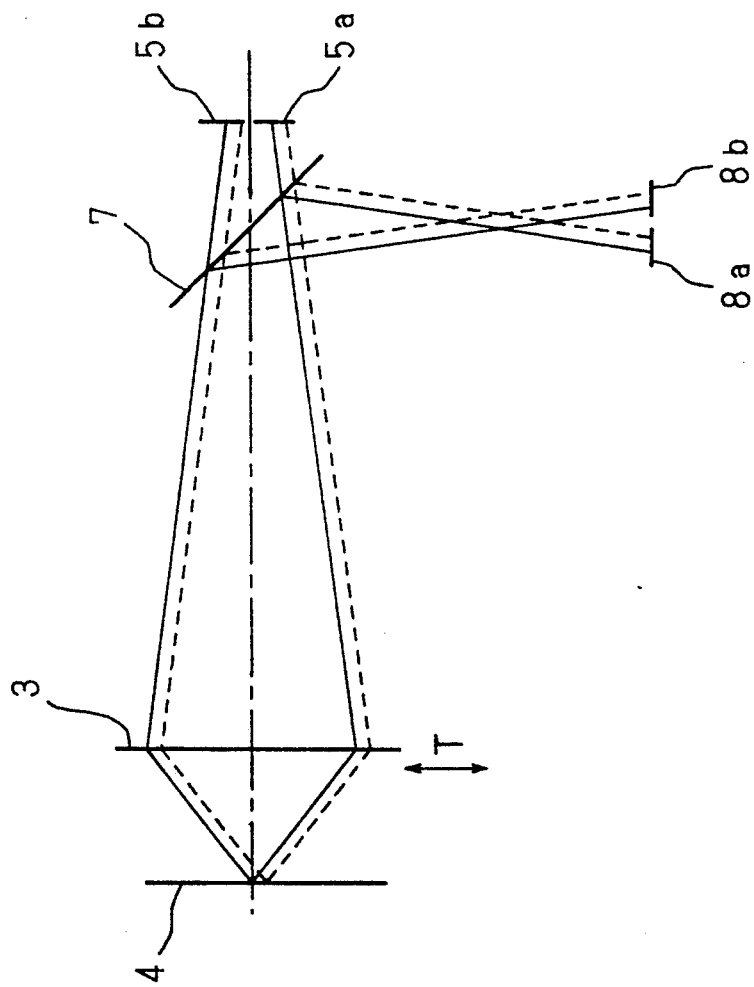
FIG. 6 is a schematic view to explain an offset in the tracking error of the optical head of the present invention.

As indicated by the broken line in FIG. 6, when the objective lens 3 moves in the direction of tracking (direction of arrow T) during tracking, the beams entering both of the first two-split photo detector 5a, 5b and second two-split photo detector 8a, 8b are shifted. As a result, a positive offset is generated in the output of the first operational amplifier 6, and a negative offset is generated in the output of the second operational amplifier 9. In other words, when the objective lens 3 moves in the direction of tracking, the output of the first operational amplifier 6 is the opposite phase to the output of the second operational amplifier 9, and then the tracking error signal which is the total output of both of the first and second operational amplifiers 6, 9, that is, the output of the third operational amplifier 10 is not to be affected by the above offset.

Figure 7:
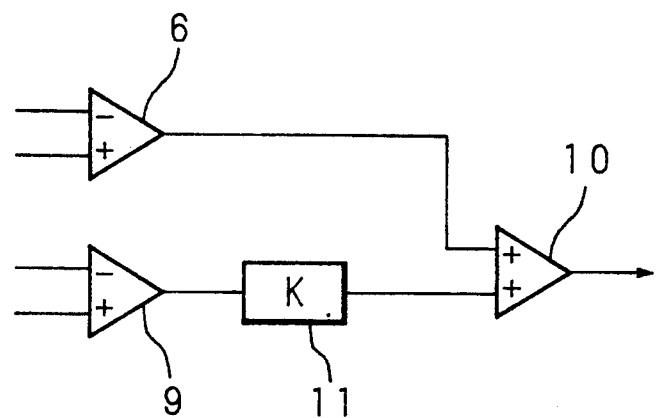
FIG. 7 is a fragmentary block diagram to illustrate construction of the other embodiment of the optical head of the present invention.

In the above embodiment, the output of the third operational amplifier 10 is obtained by simply adding the output of the first operational amplifier 6 to the output of the second operational amplifier 9. However, even when the quantity of the offset generated in the first two-split photo detector is different from that in the second two-split photo detector because the quantity of the beam entering the first two-split photo detector 5a, 5b is different from that of the beam entering the second two-split photo detector 8a, 8b, the same or similar effect as the above embodiment can be obtained by arranging an amplifier 11 between the second operational amplifier 9 and the third operational amplifier 10, as shown in FIG. 7, for example, so that the absolute values of the offsets of both of the first and second two-split photo detectors are same.

It is not intended that the photo detectors 5a, 5b, 8a, 8b be limited to the arrangement of two-split photo detectors in the embodiment of the present invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An optical head which irradiates a beam on a recording medium and detects a tracking error on said recording medium by the reflected beam from said recording medium comprising:
   a focusing unit for focusing the reflected beam from said recording medium,
   a beam splitter for splitting the light path of the reflected beam transmitted by said focusing unit into first and second light paths,
   a first photo detector arranged in said first light path and before the focal point of said reflected beam in the first light path, having a light receiving area split into at least two parts and outputting a signal responsive to the difference in the quantity of the entering beam between said two parts,
   a second photo detector arranged in said second light path and beyond the focal point of said reflected beam in the second light path, having a light receiving area split into at least two parts and outputting a signal responsive to the difference in the quantity of the entering beam between said two parts, and
   operating means for totaling the outputs of said first and second photo detectors wherein the output of said operating means is applied as a tracking control signal.

2. An optical head as set forth in claim 1, wherein said beam splitter is a half mirror.

3. An optical head as set forth in claim 1, wherein said first photo detector is a two-split photo detector.

4. An optical head as set forth in claim 1, wherein said second photo detector is a two-split photo detector.

5. An optical head as set forth in claim 1, wherein said second photo detector further comprises amplifying means of said outputting signal.

* * * * *